United States Patent [19]
Saito et al.

[11] 3,982,554
[45] Sept. 28, 1976

[54] ELECTROMAGNETIC FLAPPER VALVE

[75] Inventors: Shinji Saito, Yokohama; Masao Suzuki, Kawasaki, both of Japan

[73] Assignee: Tekyo Keiki Company Limited, Tokyo, Japan

[22] Filed: Apr. 17, 1975

[21] Appl. No.: 569,085

[30] Foreign Application Priority Data
Apr. 25, 1974   Japan........................... 49-46491[U]

[52] U.S. Cl.................................. 137/82; 137/269; 251/141; 251/129
[51] Int. Cl.²......................................... F16K 31/06
[58] Field of Search .............. 251/141, 129; 137/82, 137/269

[56]          References Cited
       UNITED STATES PATENTS

| | | | |
|---|---|---|---|
| 1,664,612 | 4/1928 | French............................ | 251/141 X |
| 2,853,659 | 9/1958 | Herion............................ | 251/141 X |
| 3,368,789 | 2/1968 | Martin............................. | 251/141 |
| 3,586,287 | 6/1971 | Knobel............................ | 251/141 X |
| 3,647,177 | 3/1972 | Lang................................. | 251/129 |
| 3,751,001 | 8/1973 | Rayment......................... | 251/129 X |

*Primary Examiner*—Arnold Rosenthal
*Attorney, Agent, or Firm*—Haseltine, Lake & Waters

[57]              ABSTRACT

An electromagnet is mounted on a ferromagnetic support member. A ferromagnetic flapper valve element arranged to control fluid flow from a nozzle orifice is movably mounted on the ferromagnetic support member and controllably moved by the electromagnet. The electromagnet, the support member and the valve element form a substantially closed magnetic circuit with an air gap being provided between the electromagnet and the valve element. Ferromagnetic and paramagnetic spacers are disposed between the electromagnet and the support member. The air gap between the electromagnet and the valve element is determined by the combined thickness of the spacers and another gap in the magnetic circuit is determined by the thickness of the paramagnetic spacer.

9 Claims, 6 Drawing Figures

ELECTROMAGNETIC FLAPPER VALVE

This invention relates to an electromagnetic flapper valve in which gaps in a magnetic circuit for improving the linearity of the fluid flow rate or pressure through the valve as a function of the current passing through said electromagnet can be set to optimum values by means of spacers.

It is known in the art to provide an electromagnetic flapper valve which comprises a ferromagnetic flapper valve element pivotally mounted on a ferromagnetic support member or an yoke which also supports an electromagnet. A fluid discharge nozzle is arranged close to the flapper valve element so that the stream of fluid is directed against the flapper valve element and exerts a force thereon. Current flow through the electromagnet creates a magnetic field which urges the valve element against the force of the fluid in a direction to block the nozzle. The flow rate through the nozzle or the fluid pressure is determined when the valve element assumes an equilibrium position such that the forces of the electromagnet and the fluid on the valve element are equalized. It is desired for practical applications that a selected one of the flow rate or fluid pressure be proportional to the current flow through the electromagnet. This goal, however, is not realized in prior art electromagnetic flapper valves.

It is therefore an important object of the present invention to provide an improved electromagnetic flapper valve in which the relationship between the electric current flow through the electromagnet and a selected one of fluid flow rate or pressure controlled by the valve is linear.

It is another object of the present invention to provide an improved electromagnetic flapper valve in which gaps are provided in a magnetic flux circuit to improve the linearity of the control function of the valve.

It is another object of the present invention to provide an improved electromagnetic flapper valve in which a ferromagnetic spacer and a paramagnetic spacer are utilized to adjustably provide gaps in a magnetic flux circuit.

It is another object of the present invention to provide an improved electromagnetic flapper valve in which the core of the electromagnet is formed with an annular groove to improve the linearity of the control function of the valve.

The above and other objects, features and advantages of the present invention can be made fully understood from the following detailed description taken with the accompanying drawings, in which.

Figure 1:
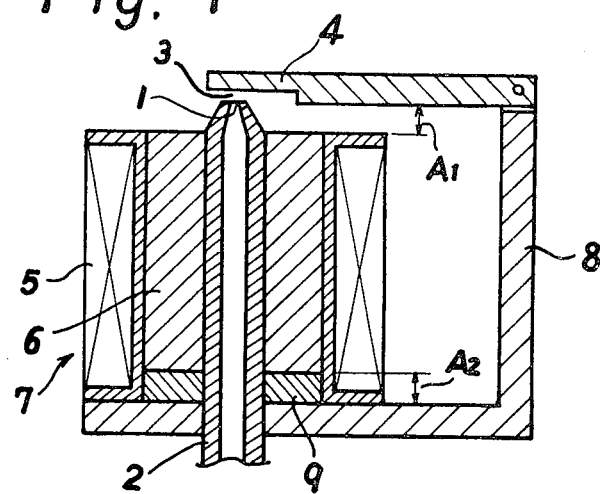
FIG. 1 is a sectional elevation of an embodiment of an electromagnetic flapper valve according to the present invention.

Referring now to FIG. 1, an electromagnetic flapper valve embodying the present invention comprises a fluid conduit 2 which may be connected to any source of pressurized fluid (not shown). The end of the conduit 2 is formed into a nozzle having a fluid discharge orifice 1. A support member or an yoke 8 pivotally supports a flapper valve element 4, the end portion 3 of the valve element 4 being disposed over the orifice 1. An electromagnet 7 comprises a core 6 surrounding the conduit 2 and an electric coil 5 wound around the core 6. The coil 5 may be connected to a suitable electric source (not shown). The electromagnet 7 is mounted on the yoke 8 with a paramagnetic spacer 9 disposed between the core 6 and the yoke 8. The yoke 8, valve element 4 and core 6 are made of suitable ferromagnetic materials and arranged in a substantially closed magnetic flux circuit. In operation, the fluid source supplies fluid through the conduit 2 and the electric source supplies electric current through the coil 5. Fluid discharged from the orifice 1 strikes the end portion 3 of the valve element 4 and applies a force thereto to urge the valve element 4 away from the orifice 1 (rotate clockwise) and unblock the orifice 1 to increase the flow rate through the orifice 1 and decrease the fluid pressure. The electromagnet 7 attracts the valve element 4 urging the valve element 4 to rotate counter-clockwise against the force of the fluid to block the orifice 1. The valve element 4 assumes an equilibrium position when the valve element 4 moves toward the orifice 1 to the extent at which the fluid pressure acting on the valve element 4 has increased to a point where the force of the fluid on the valve element 4 is equal to the magnetic force on the valve element 4 created by the electromagnet 7. As the electric current through the coil 5 is increased, the fluid pressure increases and the flow rate decreases.

It is desirable that the fluid pressure be proportional to the electric current or that the flow rate be inversely proportional to the electric current in practical fluid flow control applications. This is not attained in prior art valves of the type described.

In accordance with an important feature of the present invention, gaps $A_1$ and $A_2$ are provided in the substantially closed magnetic flux circuit defined by the yoke 8, valve element 4 and electromagnet 7. It has been determined experimentally that the control function linearity is greatly improved by means of the gaps $A_1$ and $A_2$. The gap $A_2$ may be easily provided by means of the paramagnetic spacer 9 mounted between the core 6 and the yoke 8.

Figure 2:
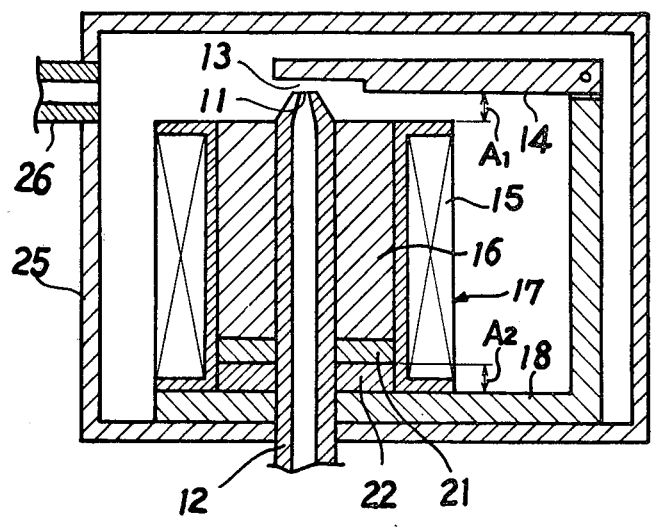
FIG. 2 is similar to FIG. 1 but illustrates another embodiment.

In practical applications it is desirable to manufacture a single valve which is capable of operating at a plurality of rated pressures, such as 70, 140 and 250 kg/cm$^2$. The values of the gaps $A_1$ and $A_2$ according to the various rated pressures, and are determined experimentally. In another embodiment of the present invention as shown in FIG. 2, like elements are designated by the same reference numerals prefixed by the numeral "1". The valve further comprises an enclosure or housing 25 having a discharge port 26. In addition to a paramagnetic spacer 22 similar to the spacer 9, a ferromagnetic spacer 21 is provided in series with the spacer 22 in the magnetic flux circuit of the valve. The core 16 is shorter than the core 6 shown in FIG. 1. The spacers 21 and 22 constitute novel and useful means of providing the gaps $A_1$ and $A_2$ at the correct values based on the rated pressure at which the valve is to operate. It will be noticed that gap $A_2$ is equal to the thickness of the spacer 22. The gap $A_1$ is determined by the combined thickness of the spacers 21 and 22, and is correctly provided simply by suitably selecting the thickness of the spacer 21. The ferromagnetic spacer 21 may be considered as a detachable part of the core 16.

In the embodiment shown in FIG. 1, it is necessary to manufacture the core 6 in a plurality of lengths and the spacer 9 in a plurality of thicknesses to provide different gaps $A_1$ and $A_2$ for different rated pressures respectively. One skilled in the art can readily understand that it is much cheaper to manufacture the spacer 21 in a plurality of thicknesses than the core 6 in a plurality of lengths. Thus, a substantial saving in manufacturing cost and inventory control is provided by the embodiment shown in FIG. 2 when it is necessary to provide valves to operate at a plurality of rated pressures. It is also easy to adjust the gaps $A_1$ and $A_2$ to precise values utilizing the spacers 21 and 22.

Figure 3:
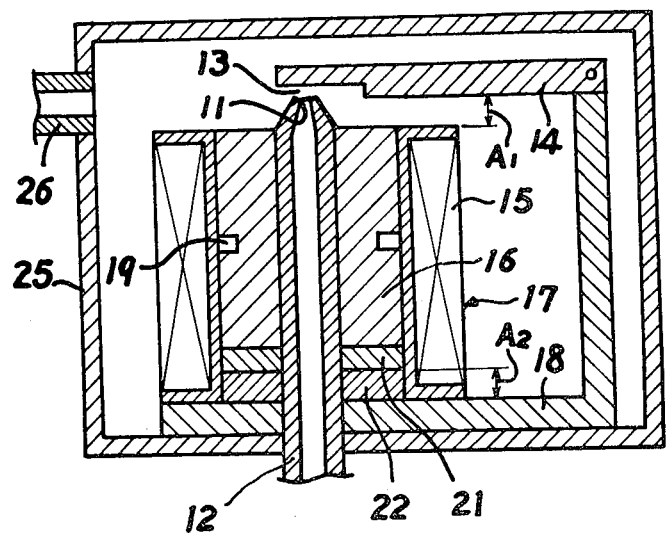
FIG. 3 is similar to FIG. 2 but illustrates another embodiment.
Figure 4:
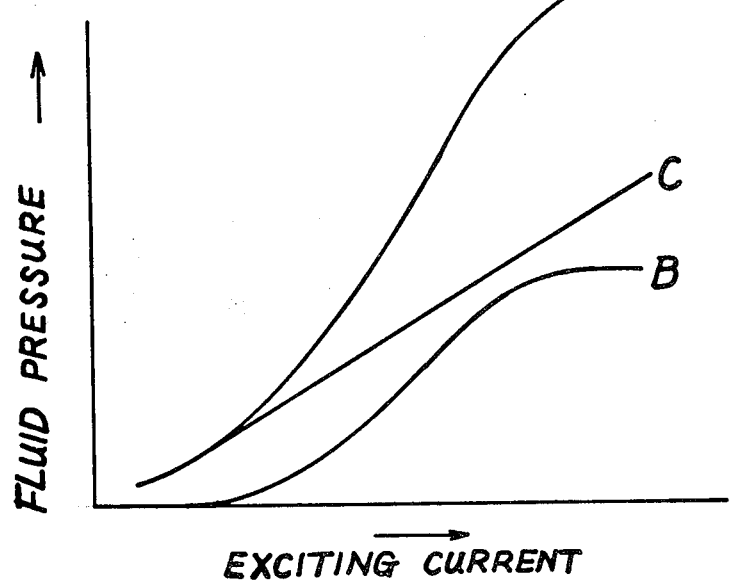
FIG. 4 is a graph of the fluid pressure as a function of electric current in a valve according to the present invention.

FIG. 3 shows another embodiment of the present invention in which an annular groove 19 is formed in the central portion of the core 16. This has a further effect of increasing the linearity of the control function of the valve by providing a partial gap in the magnetic flux circuit which causes flux leakage. This is illustrated in graphic form in FIG. 4, which shows the fluid pressure as controlled by the valve as a function of the electric current flow through the coil 15. A curve A represents the fluid pressure when the annular groove 19 is not provided. A curve B represents the pressure drop created by flux leakage due to the provision of the annular groove 19. A curve C represents the fluid pressure provided by the valve shown in FIG. 3, and is obtained by subtracting the curve B from the curve A. It will be noticed that the curve C is substantially a straight line as desired.

Figure 5A:
FIGS. 5a and 5b are sections of modified spacers according to the present invention.
Figure 5B:
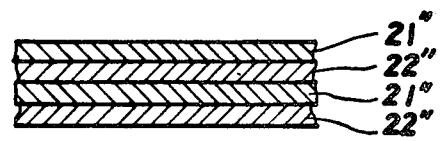

Many modifications are possible within the scope of the present invention. For example, the relative positions of the spacers 21 and 22 may be reversed. As shown in FIG. 5a, the spacer 21 may be replaced by plurality of ferromagnetic sheets 21' which may or may not be stacked together. Similarly, the spacer 22 may be replaced by a plurality of paramagnetic sheets 22'. As shown in FIG. 5b, sheets 21'' and 22'' similar to the sheets 21' and 22' respectively may be alternately disposed in series in the magnetic circuit. The sheets 21'' and 22'' may or may not be stacked together.

It is further possible to provide the flapper valve element between two opposed discharge orifices in a known manner, although not shown. A spring may be provided to suitably bias the flapper valve element. The conduit 12 may be disposed external of electromagnet 17. It will be clearly understood that the spacers 21 and 22 may be used to correct machining errors of component parts, so that such parts can be utilized rather than scrapped.

What is claimed is:

1. An electromagnetic flapper valve having a fluid discharge orifice, a ferromagnetic valve element for movably controlling fluid flow through the orifice, an electromagnet arranged to controllably move said valve element and comprising a core and an electric coil wound around said core, and a ferromagnetic support member supporting said valve element and said electromagnet so that said valve element, said support member and said core of the electromagnet are arranged in a substantially closed magnetic circuit, a ferromagnetic spacer and a paramagnetic spacer, said spacers being mounted in series between the core and the support member in substantially said closed magnetic circuit, the combined thickness of said spacers having a predetermined value and the thickness of the paramagnetic spacer comprising a predetermined gap between the core and the valve element substantially in said closed magnetic circuit.

2. The electromagnetic flapper valve as defined in claim 1 including a fluid conduit extending through the electromagnet and a fluid discharge orifice at the end of the conduit, said core being formed with an annular groove at the central portion thereof, a predetermined gap being provided in the magnetic circuit between the electromagnet and the valve element, said ferromagnetic spacer being formed as a stack of ferromagnetic sheets, said paramagnetic spacer being formed as a stack of paramagnetic sheets, said ferromagnetic and paramagnetic sheets being alternately disposed in series in said magnetic circuit.

3. The electromagnetic flapper valve according to claim 1, which further comprises a fluid conduit extending through the electromagnet and the fluid discharge orifice being provided at the end of the conduit.

4. The electromagnetic flapper valve according to claim 1, in which the core is formed with an annular groove at the central portion thereof.

5. The electromagnetic flapper valve according to claim 1, in which a predetermined gap is provided in the magnetic circuit between the electromagnet and the valve element.

6. The electromagnetic flapper valve according to claim 1, in which the ferromagnetic spacer is formed as a stack of ferromagnetic sheets.

7. The electromagnetic flapper valve according to claim 1, in which the paramagnetic spacer is formed as a stack of paramagnetic sheets.

8. The electromagnetic flapper valve according to claim 1, in which said spacers are formed as a stack of a plurality of ferromagnetic and paramagnetic sheets.

9. The electromagnetic flapper valve according to claim 1, in which the ferromagnetic and paramagnetic sheets are alternately disposed in series in the magnetic circuit.

* * * * *